Dec. 19, 1967     L. BOURDALE     3,358,843

FILTER ELEMENT AND METHOD OF MAKING SAME

Filed Oct. 14, 1966     2 Sheets-Sheet 1

INVENTOR.
LUCIEN BOURDALE
BY
Woodhams Blanchard and Flynn
ATTORNEYS

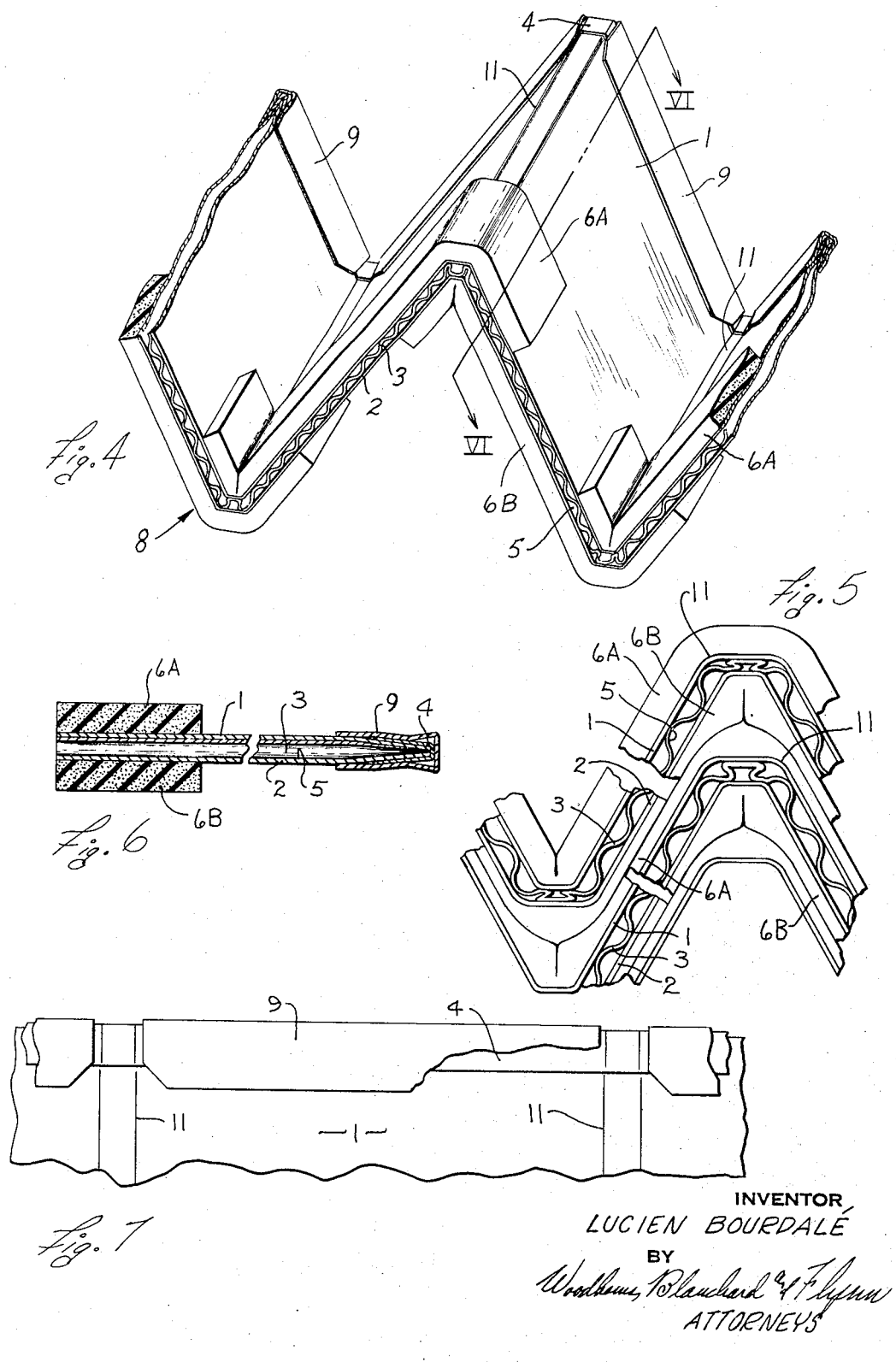

United States Patent Office 3,358,843
Patented Dec. 19, 1967

3,358,843
FILTER ELEMENT AND METHOD OF MAKING SAME
Lucien Bourdale, 33 Blvd. de Valmy, Colombes, France
Filed Oct. 14, 1966, Ser. No. 598,562
Claims priority, application France, Oct. 22, 1959,
808,193, Patent 1,324,210
4 Claims. (Cl. 210—487)

ABSTRACT OF THE DISCLOSURE

An elongated filtering panel of indefinite extended length from which filtering elements of selected length can be cut and used. The filtering panel is composed of two strips of filtering material secured to and separated by an intercalary strip, the two faces of which have channels which open through one lengthwise edge of said panel. The other lengthwise edges of the filtering material strips are joined together to form a fluid-tight joint therebetween. An edging of flexible, fluid-tight material is provided on at least one of the faces of the panel along the lengthwise edge thereof having the openings. A filtering element of desired length can be cut from the panel and immersed in a fluid which passes through the strips of filtering material, depositing the impurities on the material, and then discharges through the openings in the lengthwise edge thereof.

---

This application is a continuation-in-part of application Ser. No. 367,281, filed May 11, 1964, now abandoned, which application was a continuation of application Ser. No. 64,067, filed Oct. 21, 1960, and also abandoned, both entitled, "Filtering Elements and Filters Comprising Their Application."

The present invention relates to a filtering element of the surface type intended for the purification of fluids and capable of being adapted to use on any filter construction of known type.

A filtering element in accordance with the present invention is essentially characterized in that it is composed of two strips of filtering material separated by an intercalary strip, the two faces of which are furrowed with channels which have their openings in one of the edges of the said element.

If the two faces of a filtering, sandwich element of this type are put into contact with a fluid to be purified and if a pressure difference is created between the interior of said channels and the exterior of the said element, the fluid passes through the strips of filtering material, on the exterior of which the said fluid deposits the impurities which it is desired to remove, and subsequently follows along the channels of the intercalary material toward a peripheral zone adjacent said openings in which means are provided to collect the said fluid.

In a form of embodiment of the present invention to which it appears necessary to give preference, means are provided to join together the two strips of filtering material, in a fluid-tight manner, along at least one of the longitudinal edges thereof. This joining together or connection can be effected, for example, by insetting or by gluing a strip of fluid-tight material along said longitudinal edges. The filtering element thus produced can be dipped in the fluid to be purified, with the result that the fluid which has penetrated into the interior of the channels in said element flows out through the openings into the peripheral zone which has access to a space for receiving the filtered fluid.

In accordance with a new improvement in the present invention, an edging of flexible and fluid-tight material is provided on at least one of the faces of the element, along the edge thereof in which the channels of the intercalary material have their openings. This material can be of rubber, of felt, of wool, of asbestos felt, of foamed plastic or the like and permits of a simple means of ensuring fluid-tightness between the peripheral zone or the receiving space and the source of contaminated fluid in which the filter element is immersed.

As regards the intercalary material, this latter is preferably constituted in the form of a strip fashioned so as to form channels on its two faces and is, for example, either pleated, corrugated or fluted; there are thus obtained in a particularly simple manner channels which connect the filtering strips to the peripheral zone or evacuation space for the flow of purified fluid.

A filtering element of the type defined above has a number of advantages. Effective filtration is ensured, the deposits being formed on the exterior of the element. This element can be manufactured very simply in large-scale production by employing continuous strips for the materials constituting the said element, namely, filter sheets, intercalary strips, sealing strips, fluid-tight edgings. The continuous strips are combined to provide a filtering member of infinite length which is subsequently cut at selected intervals so as to provide the filtering elements.

The present invention is also concerned with filters of all types comprising the application of filtering elements of the types defined above. Moreover, the invention involves the method of producing inexpensive filter elements by producing a continuous filter panel from which the selected length of filtering elements are cut and sealed at their opposite ends.

The invention will in any case be clearly understood from the description which follows below, reference being made to the accompanying drawings in which certain forms of embodiment are illustrated by way of example only, without any limitation being implied, and in which:

FIGURE 4 is a broken prespective view of a filtering element having plural, transverse folds.

FIGURE 5 is a broken edge view of a plurality of filtering elements in nested condition.

FIGURE 6 is a sectional view taken along the line VI—VI in FIGURE 4.

FIGURE 7 is a fragmentary plan view of an edge portion of a filtering element.

The invention is concerned not only with a particular type of filtering element, but also with the method of producing a large volume of such elements in a rapid and accurate manner after which these elements can be adapted to specific uses.

Figure 1:
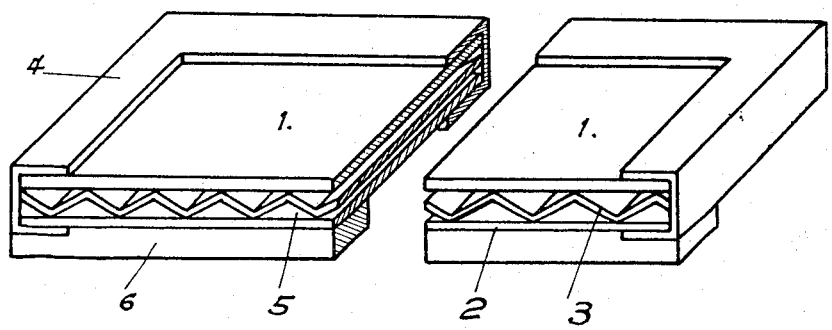
FIGURE 1 is a view in perspective of a filtering element.

Reference being made to the drawings, it can be seen that the filtering element illustrated in FIGURE 1, which has been cut from an elongated filtering panel, is composed of two strips 1 and 2 of preferably thin filtering material, the said strips being separated by a pleated strip 3 of intercalary material. The filtering element which is illustrated is provided on one lengthwise edge and both of its end edges with an insetting strip 4, which is channel-shaped in this embodiment. The other lengthwise edge of the said element is uncovered so that the adjacent openings at the ends of the channels, formed by the pleats of the corrugated strip material 3, are exposed. The edging 6 is intended to ensure fluid-tightness along the three edges which it covers.

If a filtering element of this type is dipped in a liquid to be filtered in such manner that the open edge is in communication with an evacuation space or low pressure zone, the pressure difference between the interior of said channels 5 and the exterior sides of the said strips 1 and 2 causes the fluid to pass through the strips 1 and 2, the impurities being deposited on the external faces of the said strips. The fluid subsequently moves through the channels 5 to flow toward the evacuation space.

Figure 2:
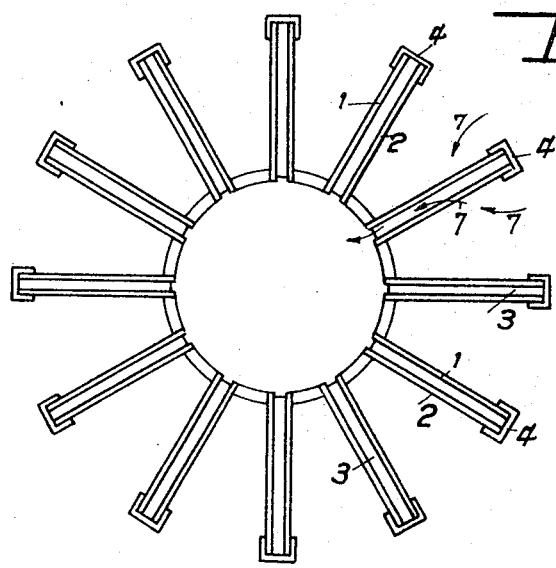
FIGURE 2 is a view in diagrammatic transverse cross section of a filter cartridge comprising the application of filtering elements in accordance with FIGURE 1.

The transverse cross section illustrated in FIGURE 2 shows diagrammatically a filter cartridge formed by twelve, flat filtering elements of the type illustrated in FIGURE 1 and joined together in star formation so that the open edges face inwardly. It will be understood that the number twelve is not given by way of limitation. The successive edging 6 defines a practically cylindrical internal chamber which it is merely necessary to connect to the evacuation space of the filter. The arrows 7 show the progress of the fluid flow through one of the elements.

Figure 3:
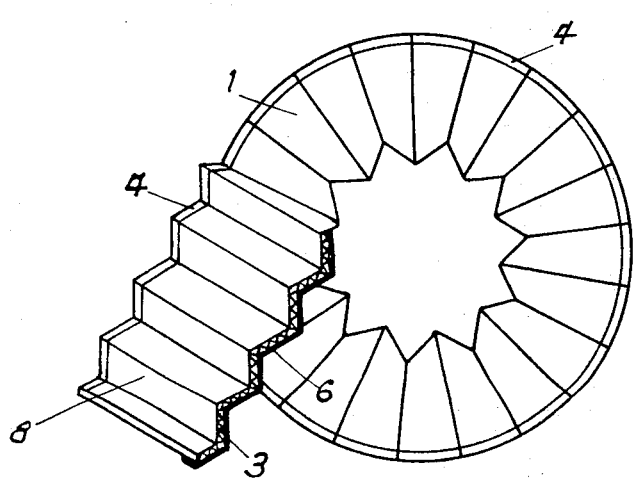
FIGURE 3 is a view from above of a filter cartridge in accordance with an alternative form.

In FIGURE 3, there can be seen a continuous strip 8 formed by a filtering element of the type in accordance with the present invention, pleated transversely and coiled in the shape of a helix. The edging 6 of each turn of the helix rests on the face 1 of the preceding turn and thus defines a fluid-tight internal chamber which is connected to the evacuation space of the filter.

It will be understood that in a cartridge of this type, the filtering surface of which is extremely large for a very small space, it would be feasible to employ more than one strip and, for example, to superpose three strips in such manner as to form a triple helix having the appearance of a helicoidal screw with a triple thread. By giving the helices an infinite pitch, the filtering elements are arranged radially with respect to the axis, and the assembly of FIGURE 2 is thus again met with, either in flat elements or in corrugated elements.

As shown in FIGURES 4–7, inclusive, a filtering element 8 designed for use in a helix, as shown in FIGURE 3, may be advantageously equipped with discontinuous edge strips 6A and 6B on opposite sides of the filtering element adjacent to the edge thereof along which the channels 5 are open. Preferably, where the filtering element has spaced transverse bends or folds 11, the edge strips 6A and 6B overlap at such bends.

In order to strengthen the filtering element seen in FIGURE 4, the lengthwise edge of the element, which is attached to the channel-shaped strip 4, is engaged by a plurality of channel-shaped braces 9 that are uniformly spaced along said element. Said braces 9 are of less length than the distance between two adjacent bends 11 and they are preferably formed from a rigid material, such as metal, and arranged to snugly embrace the edge of the filtering element. An adhesive is preferably used to attach the braces 9 to the edge of the filtering element. Accordingly, when the filtering element is arranged as shown in FIGURE 3, it presents a metallic peripheral surface which protects the entire filtering element against external damage due to rough handling.

The method of the invention is carried out, as indicated from the foregoing descriptive material, by substantially simultaneously causing the strips 1 and 2 to move along parallel paths on opposite sides of an intercalary strip 3. An adhesive is applied along the ridges of strip 3, which define the channels 5, for holding the strips 1, 2 and 3 together. As part of the same process, but preferably subsequently to the joining of the strips 1, 2 and 3, the edging 4 is applied to one lengthwise edge of the strips 1, 2 and 3. At the same time, the edging 6 or the edge strips 6A and 6B, are applied either in a continuous strip or discontinuous strips along the other lengthwise edge of the element, depending upon the particular use which is intended. The channel edging 4 and the resilient edging 6, 6A or 6B are preferably moved at the same rate as the strips along a path adjacent the lengthwise edges thereof. An adhesive is used to secure the preferably moving strip 4 and edging 6 or strips 6A and 6B to the moving strips 1 and 2, which strips are fabricated from sheet material which is specifically selected for its filtering qualities.

The forms of construction of the present invention which have just been described have been given solely by way of example and not in any sense by way of limitation, and a large number of modifications could be made in the said forms without thereby departing from the scope or the spirit of the present invention.

The embodiments of the invention in which an exclusive property or privilege is claimed are defined as follows:

1. An elongated filtering panel from which filtering elements of selected lengths can be cut and used after sealing the cut ends thereof, the combination comprising:

two elongated, thin and substantially parallel strips of filtering material having interior surfaces facing each other and having exterior surfaces facing away from each other, said strips being capable of being of indefinite extended length;

an elongated, corrugated and intercalary strip disposed between and extending lengthwise between said filtering material strips and separating same from each other a predetermined distance, the side surfaces of the corrugations in said intercalary strip being respectively engaged by the interior surfaces of said filtering material strips at longitudinally spaced and laterally extending zones spaced lengthwise along said strips, said strips being spaced from each other between said zones, said filtering strips and intercalary strip being of substantially identical and uniform widths so that said zones extend from adjacent one set of lengthwise edges of said strips to adjacent the opposite set of lengthwise edges to define passageways which extend from and between said sets of edges whereby fluid can pass through said filter material strips and into said passageways;

adhesive means securing said intercalary strip and said filtering material strip to each other along said zones, said adhesively secured strips having a plurality of transverse and spaced fold lines extending between the lengthwise sets of edges so that the filtering panel is divided into hingedly connected sections which alternately extend in opposite directions in a generally zig-zag fashion;

an elongated and fluid-tight edge member having wall means covering one set of said lengthwise edges, and means including adhesive means securing said edge member to the said filtering material strips, the ends of said passageways adjacent said one set of edges being closed by said edge member and the other ends of said passageways being open, whereby fluid in said passageways can flow through the open ends thereof;

edging of flexible and fluid-tight material; and adhesive means securing said flexible material upon the exterior surface of at least one of said filtering material strips adjacent the other set of edges thereof, said flexible material being arranged so that the flexible material on one filtering element can engage a corresponding edge portion of another filtering element to provide a fluid-tight seal therebetween, whereby, when the filtering element is immersed in the fluid to be filtered and a differential pressure is maintained between the interior and exterior surfaces of said filtering strips, said flexible material will withstand leakage and thereby cause the fluid to pass through the filtering strips and said passageways.

2. A filtering panel according to claim 1 wherein said flexible material is arranged in uniformly spaced, discontinuous lengths on the exterior surfaces of both filtering material strips, the ends of the lengths on one exterior surface overlapping the ends of the lengths on the other exterior surface, and said panel having a plurality of substantially uniformly spaced, transverse folds intersecting said flexible material in the region of said overlapping.

3. A filtering element according to claim 2 including a plurality of spaced, channel-shaped braces embracing the one set of lengthwise edges of said strips, said braces being of uniform length and located between each pair of adjacent folds.

4. In a method of producing finite filter elements from a filter panel of indefinite extended length, the steps comprising:

causing an elongated strip of corrugated sheet material to move along a linear path, said corrugated strip having uniformly spaced, transverse grooves and ridges on both sides thereof;

applying an adhesive to said ridges on both sides of said corrugated strip;

causing a pair of similar, elongated and thin filtering strips to move along said path on opposite sides thereof at the same rate as said corrugated strip and to engage firmly the adhesive coated ridges on the opposite sides of said corrugated strip, said corrugated strip and filtering strips being of substantially the same width;

causing a channel-shaped edge member to move along said path at the same rate as said corrugated strip adjacent one set of lengthwise edges of said strips;

adhesively securing said channel member to the exterior surfaces of said filtering strips as they move along said path;

applying an edging of flexible and fluid-tight material to the exterior surface of at least one of said filtering strips along the other set of lengthwise edges thereof as said filtering strips move along said path;

cutting said filtering panel at a selected point lengthwise thereof to produce a filtering element having opposite cut edges; and applying a fluid-tight seal to the opposite cut edges of the cut filtering element.

References Cited

UNITED STATES PATENTS

| | | |
|---|---|---|
| 2,024,426 | 12/1935 | Butler. |
| 2,190,683 | 2/1940 | Schaaf. |
| 2,374,755 | 5/1945 | Kisch _____ 210—486 |
| 2,423,547 | 7/1947 | Behlen _____ 210—499 |
| 2,457,958 | 1/1949 | Walker _____ 210—493 |
| 2,540,362 | 2/1951 | Winslow et al. ___ 210—306 X |
| 2,663,660 | 12/1953 | Layte _____ 210—493 X |
| 2,788,901 | 4/1957 | Boeddinghaus et al. _ 210—496 X |
| 2,883,058 | 4/1959 | Jaume _____ 210—494 X |
| 2,897,971 | 8/1959 | Gewiss _____ 210—493 |
| 2,970,699 | 2/1961 | Leuthesser _____ 210—493 X |
| 3,025,963 | 3/1962 | Bauer _____ 210—493 |
| 3,067,504 | 12/1962 | Lubben et al. _____ 210—486 X |
| 3,074,561 | 1/1963 | Mummert _____ 210—486 X |
| 3,087,623 | 4/1963 | Gewiss _____ 210—493 |

FOREIGN PATENTS

| | | |
|---|---|---|
| 798,652 | 3/1936 | France. |
| 485,468 | 10/1953 | Italy. |

REUBEN FRIEDMAN, *Primary Examiner.*

SAMIH N. ZAHARNA, *Examiner.*

D. M. RIESS, *Assistant Examiner.*